United States Patent
Konno et al.

(10) Patent No.: US 11,442,077 B2
(45) Date of Patent: Sep. 13, 2022

(54) CAPACITIVE MICROMECHANICAL ACCELEROMETER

(71) Applicant: MURATA MANUFACTURING CO., LTD., Nagaokakyo (JP)

(72) Inventors: Akira Konno, Helsinki (FI); Yoshitaka Kato, Helsinki (FI); Ville-Pekka Rytkönen, Klaukkala (FI)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 16/911,830

(22) Filed: Jun. 25, 2020

(65) Prior Publication Data
US 2020/0408803 A1 Dec. 31, 2020

(30) Foreign Application Priority Data

Jun. 26, 2019 (FI) ...................................... 20195563

(51) Int. Cl.
*G01P 15/125* (2006.01)
*G01P 1/00* (2006.01)
*G01P 15/18* (2013.01)

(52) U.S. Cl.
CPC ............ *G01P 15/125* (2013.01); *G01P 1/003* (2013.01); *G01P 15/18* (2013.01)

(58) Field of Classification Search
CPC ..... G01P 2015/0831; G01P 2015/0882; G01P 15/18; G01P 15/125
See application file for complete search history.

(56) References Cited

U.S. PATENT DOCUMENTS

2004/0154397 A1 8/2004 Platt et al.
2013/0068018 A1* 3/2013 Seeger ............... G01C 19/5747
73/504.12
(Continued)

FOREIGN PATENT DOCUMENTS

EP 3 014 284 B1 4/2017
EP 3 401 688 A1 11/2018
(Continued)

OTHER PUBLICATIONS

European Search Report dated Nov. 20, 2020 corresponding to European Patent Application No. 20178469.
(Continued)

*Primary Examiner* — Walter L Lindsay, Jr.
*Assistant Examiner* — Andrew V Do
(74) *Attorney, Agent, or Firm* — Squire Patton Boggs (US) LLP

(57) ABSTRACT

The present invention relates to capacitive micromechanical accelerometers, and in particular to acceleration sensors with movable rotors which may rotate out of a substrate plane when the accelerometer undergoes movement with an acceleration component perpendicular to the substrate plane. The capacitive micromechanical accelerometer includes additional damping springs to reduce unwanted movement of the rotor in the substrate plane, thereby reducing the parasitic capacitance that results from motion of the rotor in the substrate plane. The damping springs are vertically recessed with respect to other components of the accelerometer in order to minimise the effect of the damping springs on movement of the rotor out of the substrate plane.

7 Claims, 4 Drawing Sheets

(56) References Cited

U.S. PATENT DOCUMENTS

| | | |
|---|---|---|
| 2015/0000403 A1 | 1/2015 | Liukku et al. |
| 2017/0023606 A1 | 1/2017 | Naumann |
| 2018/0321038 A1 | 11/2018 | Liukku et al. |
| 2019/0135612 A1 | 5/2019 | Boessendoerfer et al. |

FOREIGN PATENT DOCUMENTS

| | | |
|---|---|---|
| EP | 3 409 639 A1 | 12/2018 |
| JP | 2016-525212 A | 8/2016 |
| JP | 2019-023613 A | 2/2019 |

OTHER PUBLICATIONS

Finnish Search Report dated Feb. 7, 2020 corresponding to Finnish Patent Application No. 20195563.
Notice of Reasons for Rejection dated Aug. 3, 2021 corresponding to Japanese Patent Application No. 2020-101899, with English translation thereof.

\* cited by examiner

CAPACITIVE MICROMECHANICAL ACCELEROMETER

TECHNICAL FIELD

This disclosure relates to capacitive accelerometers and to acceleration sensors with movable rotors which may rotate out of a substrate plane when the accelerometer undergoes movement with an acceleration component perpendicular to the substrate plane. Such sensors may be combined with two other sensors which measure acceleration in the substrate plane to form a three-axis accelerometer. Such accelerometers may be used in automotive applications, such as Electronic Stability Control (ESP/ESC), Antilock Braking (ABS), Electric Parking Brake (EPB), Hill Start Assistance (HSA), Electronically Controlled Suspension (ECS), headlight levelling or airbag deployment, or in combination with a gyroscope as part of an inertial measurement unit (IMU) for navigation purposes.

BACKGROUND

Each capacitive sensor in a three-axis accelerometer may comprise a stator which is immobile in relation to the substrate and a rotor which is at least partly mobile in relation to the substrate. In this disclosure the terms "rotor" and "stator" both refer to interlinked micromechanical structures, such as bars or beams. The structures and their interconnections may be formed by etching a substrate, for example a silicon substrate.

In this disclosure, the terms "bar" and "beam" refer to elongated structures, for example made of silicon, which are typically rigid compared to more flexible structures which may be called "springs". Rigidity and flexibility are relative terms. Although the bars and beams which constitute a rotor will have some flexibility, they will still to a good approximation retain their mutual positions in relation to each other when the rotor moves, and only the springs from which the rotor is suspended will undergo significant flexible deformation due to the movement.

Rotors and stators typically comprise electrically conducting electrode areas on at least some of their interlinked structures to facilitate electrical measurements between the rotor and the stator.

A three-axis accelerometer typically comprises a substrate plane, which may be labelled the X-Y plane. Stators may be fixed structures in the substrate plane. Acceleration sensors may be implemented in the substrate plane with rotors which undergo linear motion along an axis in the plane in response to accelerating movement along that axis. The rotor may be implemented as a seesaw, so that it is attached to one or more torsion springs and undergoes rotational motion about a rotational axis defined by the torsion springs in response to accelerating movement which is not parallel to that axis. In this way, the rotor moves in a direction out of the substrate plane when it undergoes rotational motion.

If the rotor is implemented as a seesaw, its centre of mass should not coincide with the rotational axis, because that would make it unresponsive to linear acceleration. A seesaw rotor should therefore be an unbalanced seesaw, at least to some extent. A seesaw rotor may be implemented as a completely one-sided seesaw, so that all parts of the rotor lie on one side of the rotational axis, which may be called the first side. More precisely, a seesaw rotor is one-sided if it is possible to draw a plane which crosses its rotation axis so that the entire rotor lies on one side of the plane. A rotor implemented as a seesaw may also be two-sided, so that some parts of the rotor lie on one side of the axis, which may be called the first side, and some parts lie on the opposite side of the axis, which may be called the second side. For a two-sided rotor, it is not possible to draw a plane which crosses its rotation axis so that the entire rotor lies on one side of the plane.

SUMMARY OF THE INVENTION

The present invention relate to capacitive micromechanical accelerometers, in particular to a capacitive micromechanical accelerometer that comprises a substrate, which defines a substrate plane, a rotor, which is mounted to the substrate via one or more torsion springs enabling rotation of the rotor with respect to the substrate plane about a rotor rotation axis, and a stator, which is fixed with respect to the substrate plane.

The rotor includes one or more rotor electrodes and the stator includes one or more stator electrodes, and the rotor and stator electrodes are configured such that rotation of the rotor causes a change in the effective area of the rotor and stator electrodes and/or the distance between the rotor and stator electrodes;

The capacitive micromechanical accelerometer further comprises one or more damping springs connecting the rotor to the substrate, wherein each damping spring has a height perpendicular to the substrate plane that is smaller than a height perpendicular to the substrate plane of the one or more torsion springs. The damping springs damp movement of the rotor in the X-Y plane, i.e. in the substrate plane. In particular, the use of recessed springs, i.e. springs with a height that is smaller than the height of other components of the accelerometer, allows damping in the X-Y plane to occur without significantly affecting the movement of the rotor in the Z-direction, i.e. out of the substrate/X-Y plane.

One of more of the damping springs may extend from the rotor to the exterior of the capacitive micromechanical accelerometer.

The accelerometer may comprise two externally extending damping springs.

The damping springs may be oriented parallel to the rotor rotation axis or may be oriented perpendicular to the rotor rotation axis.

The micromechanical accelerometer may comprise four externally extending damping springs. Two of the damping springs may be oriented parallel to the rotor rotation axis and two of the damping springs may be oriented perpendicular to the rotor rotation axis.

One or more externally extending damping springs may be connected to a distal end of the rotor to the rotor rotation axis.

The rotor may comprise two longitudinal rotor bars and a transversal rotor bar, the two longitudinal rotor bars extending perpendicularly away from the rotor rotation axis and the transversal rotor bar being disposed at the distal end of the longitudinal rotor bars, parallel to the rotor rotation axis, and wherein the one or more rotor electrodes are disposed on the transversal rotor bar.

The rotor may be connected to the substrate via the one or more torsion springs and a rotor suspender, such that the stator and rotor suspender are fixed to a common anchor point on the substrate, and the one or more damping springs are connected to the common anchor point.

The damping springs extend away from the rotor towards the interior of the accelerometer in a direction parallel to the rotor rotation axis.

The damping springs extend away from the rotor towards the interior of the accelerometer in a direction perpendicular to the rotor rotation axis.

The accelerometer may comprise four damping springs, a first pair of which extend inwardly from the rotor and a second pair of which extend externally from the rotor. One of the first and second pairs of damping springs may be oriented parallel to the rotor rotation axis and the other of the first and second pairs of damping springs may be oriented perpendicular to the rotor rotation axis.

The one or more rotor electrodes and one or more stator electrodes may form interleaved combs or parallel plates.

DETAILED DESCRIPTION

Figure 1:
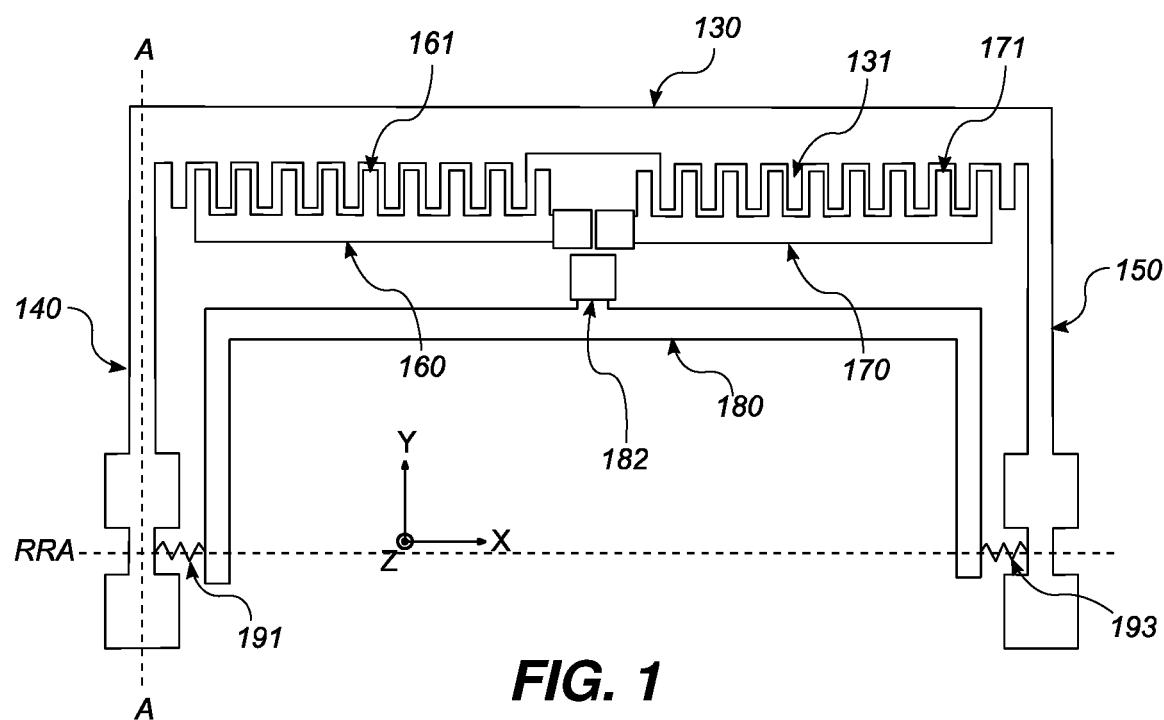
FIG. 1 illustrates schematically a capacitive micromechanical accelerometer.

This disclosure describes a capacitive micromechanical accelerometer. The accelerometer includes a substrate, which defines a substrate plane extending in a transversal direction and a longitudinal direction (shown as the X- and Y-axes in FIG. 1), the transversal direction being perpendicular to the longitudinal direction. The accelerometer measures acceleration along a vertical axis perpendicular to the substrate plane (shown as the Z-axis in FIG. 2). The accelerometer includes a rotor which is mobile in relation to the substrate, and a rotor suspender and one or more stators which are immobile in relation to the substrate. The rotor includes one or more rotor electrodes and the stator(s) comprises one or more stator electrodes.

The rotor and stator electrodes are arranged to form a capacitor, with the one or more rotor electrodes forming one plate of the capacitor and the one or more stator electrodes forming the other plate of the capacitor. In a preferred embodiment, such as that depicted in FIG. 1, the rotor electrodes 131 and stator electrodes 161, 171 are formed as interleaved teeth. However, the present invention is applicable to MEMS accelerometers using other types of rotor and stator electrodes, such as plate electrodes, where the acceleration of the MEMS device is detected by measuring the movement of the rotor electrode out of the substrate plane. Thus, while the invention is described and depicted with respect to comb electrodes, it will be appreciated that it may be used with other types of electrodes.

According to the conventional law of capacitance, the capacitance C is proportional to the area of overlap between the electrodes A and the distance of separation d between the capacitor plates, i.e.

$$C = \varepsilon \frac{A}{d}$$

where $\varepsilon$ is the permittivity of the dielectric material disposed between the plates. In a neutral position, in which the rotor is aligned parallel with the stator, i.e. parallel to the substrate plane, the one or more rotor electrodes and one or more stator electrodes have a large area of overlap A, providing a large capacitance C. Furthermore, the distance d between the electrodes is small. For a comb electrode capacitor, as the rotor rotates out of parallel with the substrate plane, the area of overlap A decreases and the distance d increases, resulting in decreased capacitance C. For a plate electrode capacitor, the distance d increases, also resulting in decreased capacitance C. The extent to which the rotor moves, and thus the area of overlap A and/or distance d changes, depends on the component of applied force in the Z-direction, which is directly proportional to the acceleration of the package in the Z-direction. Thus, the extent of the change in capacitance depends on the acceleration of the package, and the acceleration of the package in the Z-direction can therefore be determined by measuring the change in capacitance. The accelerometer is therefore configured to perform differential capacitance measurements, and the differential capacitance measurement can then be used to calculate the acceleration of the package in the Z-direction.

This change in the capacitance of the rotor-stator system is referred to as the "out-of-plane" mode, since the change in capacitance depends on the movement of the rotor out of parallel with the substrate plane. However, accelerometers such as those described above are susceptible to parasitic "in-plane" modes, causing an undesirable change in the capacitance that is not directly related to the acceleration of the package. For example, in the embodiment depicted in FIG. 1 in which the rotor electrodes 151 and stator electrodes 161, 171 are interleaved, movement of the rotor electrodes in the X-Y plane, i.e. movement of the rotor with no Z-component, causes a further change in the distance d between the rotor and stator electrodes, thereby changing the capacitance C in a way that is unrelated to the Z-axis acceleration that is being measured. In a plate electrode capacitor, movement of the rotor electrode in the X-Y plane causes the area of overlap A between the plates to change, thereby changing the capacitance C in a way that is unrelated to the Z-axis acceleration. This parasitic in-plane mode of capacitance change is particularly pronounced when the accelerometer is subjected to externally driven vibrations, and especially so when the vibrations coincide with the natural frequency of the accelerometer package. The undesirable movement of the rotor in the parasitic mode is depicted in and described in more detail with respect to FIG. 3.

FIG. 1 illustrates schematically an embodiment of the capacitive micromechanical accelerometer using comb electrodes. The substrate plane corresponds in this disclosure to the X-Y plane. In this disclosure the term "substrate" refers to the body from which the micromechanical structures which constitute the sensor have been prepared. When the structures are completed, the remaining parts of the substrate form a supporting body which surrounds the accelerometer.

The substrate may, for example, be a silicon wafer. The micromechanical structures which constitute the sensor may be manufactured from the substrate by etching and coating methods. In other words, in this disclosure the term "substrate" refers to a thin substrate which forms the structure layer (or device layer) from which the microelectromechanical structures in the accelerometer are manufactured. This substrate typically requires structural support from a separate, much thicker handle wafer or support wafer. In this disclosure, the substrate plane, or X-Y plane, is parallel with the rotor when the rotor is at rest, i.e. when the rotor is in a neutral position aligned with the stator and generally parallel to the surface of the substrate upon which other elements of the accelerometer are formed.

Figure 2:
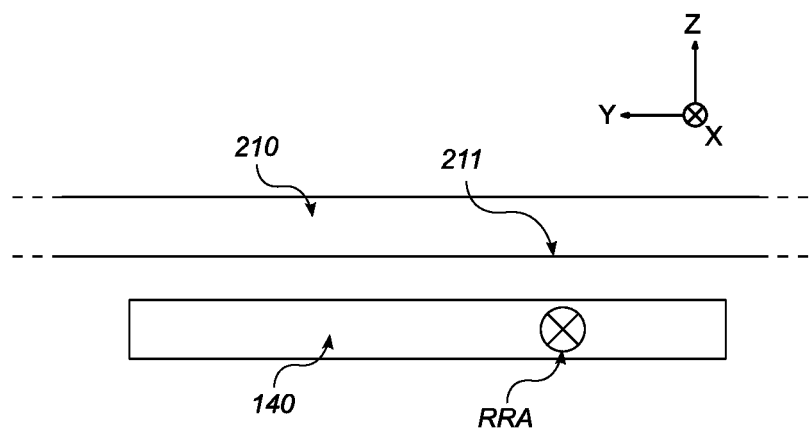
FIG. 2 shows a cross-section of the capacitive micromechanical accelerometer depicted in FIG. 1.

As mentioned above, a vertical Z-axis is be defined to be perpendicular to the X-Y plane. Some of the micromechanical components depicted in FIG. 1 may have the same thickness as the substrate, others may have a smaller thickness. In this disclosure, the substrate in its entire thickness constitutes the X-Y plane, and the terms "above" and "below" refer to differences in Z-coordinates from the surface of the substrate. In other words, an object "above" the substrate plane depicted in FIG. 1 may be interpreted to lie closer to the viewer than the top surface of the components which is illustrated in FIG. 1, while an object "below" the substrate plane may be interpreted to lie further away from the viewer than the bottom surface of the components depicted in FIG. 1. FIG. 2 illustrates an accelerometer package 210 above the device component/rotor 140, which is in the substrate plane.

The accelerometer is configured for measuring acceleration in the direction of the Z-axis, which will be referred to as the vertical axis in this disclosure, and which is perpendicular to the substrate plane. The accelerometer comprises a rotor made up of a transversal rotor bar 130 and two longitudinal rotor bars 140 and 150. Together, the transversal rotor bar 130 and the two longitudinal rotor bars 140 and 150 form a frame which may partly surround other components on the substrate plane. As briefly mentioned above, the rotor also comprises a set of rotor electrode fingers 131, which function as rotor electrodes. The number of fingers may be much larger, and the separations between fingers much smaller, than what is schematically illustrated in FIG. 1.

The sensor in FIG. 1 also comprises two stators with transversal stator bars 160 and 170 and corresponding sets of stator electrode fingers 161 and 171, which function as stator electrodes. The rotor and stator electrodes may be coated, and they may be vertically recessed from the top and/or bottom face of the substrate. As illustrated in FIG. 1, the frame-shaped rotor may partly surround the stators. The transversal stator bars 160 and 170 are fixed to the substrate at stator anchor points 162 and 172. The term "anchor point" refers in this disclosure to a region where objects such as bars may be firmly attached to the substrate.

The location and number of rotor and stator electrodes, as well as their geometry and mutual positioning, may be optimized for capacitive measurements in many ways depending on the intended measurement application.

As mentioned above, the rotor is connected to a rotor suspender, which typically includes one or more transversal torsion springs attached to the rotor. The torsion springs are aligned on a transversal rotor rotation axis. While the use of torsion springs is described in detail herein, it will be appreciated that other types of springs could be used to join the rotor to the rotor suspender.

The rotor suspender may be anchored to one or more rotor anchor points. In this disclosure, the term "suspender" refers to a structure which comprises at least one or more springs, such as torsion springs. If the one or more springs are not connected directly to an anchor point, the suspender structure may also refer to bars or beams connected in a sequence extending from the rotor anchor point(s) to the springs. Where torsion springs are used, the rotor turns when the torsion springs, which are transversal, are twisted. The optional bars or beams in the suspenders do not undergo a significant amount of bending or twisting. Instead, their primary function is displacement because they allow the rotor anchor points to be placed a certain distance from the torsion springs.

In this disclosure, the term "torsion spring" refers to a silicon structure with an aspect ratio which makes the torsion spring susceptible to torsional twisting about its lengthwise dimension. In this case, a "transversal" torsion spring means a spring whose lengthwise dimension is parallel with the X-axis in FIG. 1. Transversal torsion springs may be narrow in the Y-direction to allow torsional twisting, but thick in the vertical Z-direction to prevent translational movement out of the X-Y plane. Alternatively, the transversal torsion springs may have a meandering shape in the X-Y plane and be thick in the Z-direction. Meandering springs can allow torsional twisting about the x-axis, for example, without necessarily being narrow in the direction of the y-axis.

In the device of FIG. 1 the rotor suspender comprises a rotor suspender bar 180, and where a first transversal torsion spring 191 is attached to one end of the rotor suspender bar 180, and a second transversal torsion spring 193 is attached to the other end of the rotor suspender bar 180. The rotor suspender bar 180 is anchored to the rotor anchor point 182. Additional suspender bars may be added between the anchored suspender bars and the torsion springs if the torsion springs need to be displaced further from the rotor anchor point. These additional suspender bars may extend either in the transversal or the longitudinal direction.

The rotor, which comprises the transversal rotor bar 130 and the first and second longitudinal rotor bars 140 and 150, may be termed a "seesaw" because the transversal torsion springs 191 and 193 allow the rotor to pivot about the transversal rotor rotation axis (RRA) illustrated in FIG. 1A. This axis is determined by the location of the torsion springs 191 and 193. The two torsion springs must be aligned on the same axis to facilitate the rotation or pivoting of the rotor.

As described above, when the accelerometer undergoes accelerating motion in a vertical direction, the rotor can rotate about the transversal rotor rotation axis and this movement can be detected with a differential capacitive measurement conducted between the rotor and stator electrodes described above.

The rotor illustrated in FIG. 1A may also be characterized as a two-sided seesaw because it extends to both sides of the transversal rotor rotation axis (which may be hereafter referred to as the RRA or as the transversal RRA). In other words, each longitudinal rotor bar 140 and 150 extends across the transversal rotor rotation axis, from a first side of the transversal rotor rotation axis to a second side. However, the present invention is not limited to a two-sided seesaw rotor and may indeed be used with a one-sided rotor too.

The rotor is illustrated from another angle in FIG. 2, which shows the cross-section A-A from FIG. 1. FIG. 2 shows the first longitudinal rotor bar 140 and the accelerometer package 210, with inner package plane 211 adjacent to the substrate plane. The longitudinal rotor bar 140 extends to both sides of the RRA. In other words, the rotor 140 extends both in a first direction and in a second direction from the RRA. These two directions are diametrically opposed, because the rotor forms a planar structure which rotates about the RRA. In FIG. 140, first longitudinal rotor bar lies in the substrate plane. The first direction is the positive Y-direction and the second direction is the negative Y-direction. When the accelerometer experiences acceleration in the direction of the Z-axis, the rotor rotates about the RRA, out of the X-Y plane. The stiffness of the torsion springs 191 and 193 are configured to reach suitable movement with desired accelerations that are application-specific.

The package 210 extends beyond the first sensor to the left and right. The package surrounds the accelerometer on all sides, but the parts of the package which lie distant from the sensor are not relevant to this disclosure, other than as potential anchor points for damping springs, as described in more detail below, and are not illustrated in FIG. 1. The space between the package and the sensors is a sealed space, typically filled with an inert gas.

Figure 3:
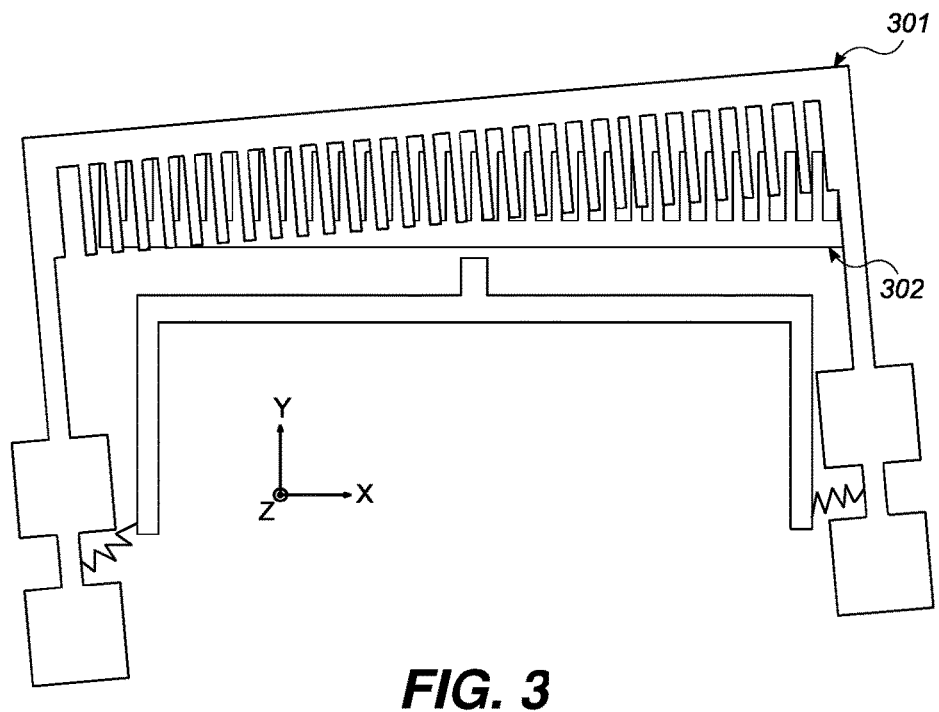
FIG. 3 depicts the movement of the rotor of the capacitive micromechanical accelerometer in the parasitic mode.

FIG. 3 depicts the position of the rotor 301 during movement of the rotor in the X-Y plane with respect to the stator 302, i.e. in the parasitic mode. Movement of the rotor 301 causes a change in the distance between the rotor electrodes and stator electrodes, resulting in a change in capacitance that is additional and not directly related to the acceleration of the package in the Z direction, leading to incorrect acceleration measurements. For example, movement of the rotor 301 in the X-Y plane can be caused by acceleration of the package in the X-Y direction and is particularly pronounced when the package vibrates at its natural frequency in the X-Y plane. Such motion leads to significant errors in the calculated acceleration of the device due to the parasitic in-plane mode of capacitance change described above.

Similarly, in the case of the plate electrode accelerometer (not shown in the drawings) movement of the rotor electrode in the X-Y plane can cause the area of overlap between the rotor electrode and stator electrode to decrease, changing the capacitance of the system in a way that is unrelated to the acceleration of the package in the Z direction.

Embodiments of the present invention reduce motion of the rotor 301 in the X-Y plane by providing additional damping springs connecting the rotor 301 to the substrate. While the damping springs are depicted and described with respect to a comb electrode accelerometer, such as that depicted in FIGS. 1 and 2, it will be understood that the same damping springs can be used with the plate electrode accelerometer too. However, the including of additional springs in a MEMS accelerometer is not trivial: the addition of damping springs connecting the rotor to the housing also significantly stiffens the normal mode of the device, i.e. reduces motion of the rotor in the Z-direction, significantly decreasing the sensitivity of the device.

Thus, in order to incorporate damping springs into the device, the damping springs must provide enough stiffness in the X-Y plane to reduce the motion of the rotor in the X-Y plane, while also providing significantly lower stiffness in the Z direction, to permit movement of the rotor in the Z direction without significant impediment. This problem can be overcome by using recessed damping springs, which have lower height in the Z direction than other components of the MEMS accelerometer, such as the rotor and/or stator. It can be shown that for a beam spring, the spring constant in the out-of-plane mode, i.e. the Z direction, is proportional to $wh^3/l^3$, where w is the width of the beam in the Y direction of the X-Y plane, h is the height of the beam in the Z direction, and l is the length of the beam in the X direction of the X-Y plane. Thus, by minimising the height of the beam in the Z direction, the spring constant, i.e. the stiffness of the spring, in the Z direction is decreased geometrically. In contrast, the stiffness of the spring in X direction is directly proportional to the height h. Thus, the stiffness of the spring in the X direction is significantly less affected by a change in the height h than the stiffness in the Z direction.

In a typical process of manufacturing a MEMS device, such as a MEMS accelerometer, a substrate is etched to produce the micromechanical structures, such as rotors, stators and springs. Before etching, the substrate is deposited onto the support wafer and has an upper surface that lines parallel to the substrate plane, i.e. perpendicular to the Z direction. The upper surface defines a height of the substrate in the Z direction above the support wafer. During etching, some parts of the substrate upper surface are protected from the etchant by a mask material which is resistant to the etchant. When the mask is removed following etching, the portions of the substrate upper surface that were masked remain at the same height above the substrate as before etching. Other parts of the substrate, which have been etched such that their height above the substrate is smaller than the masked portions of the substrate are said to be recessed. The recession depth of a micromechanical structure is defined as the vertical distance from the upper surface of the substrate to the upper surface of the micromechanical structure.

A method for manufacturing such a multi-level micromechanical structure comprising elements with differing heights is described in European patent application publication EP 3409639 A1, the disclosure of which is incorporated by reference in this application.

Figure 4:
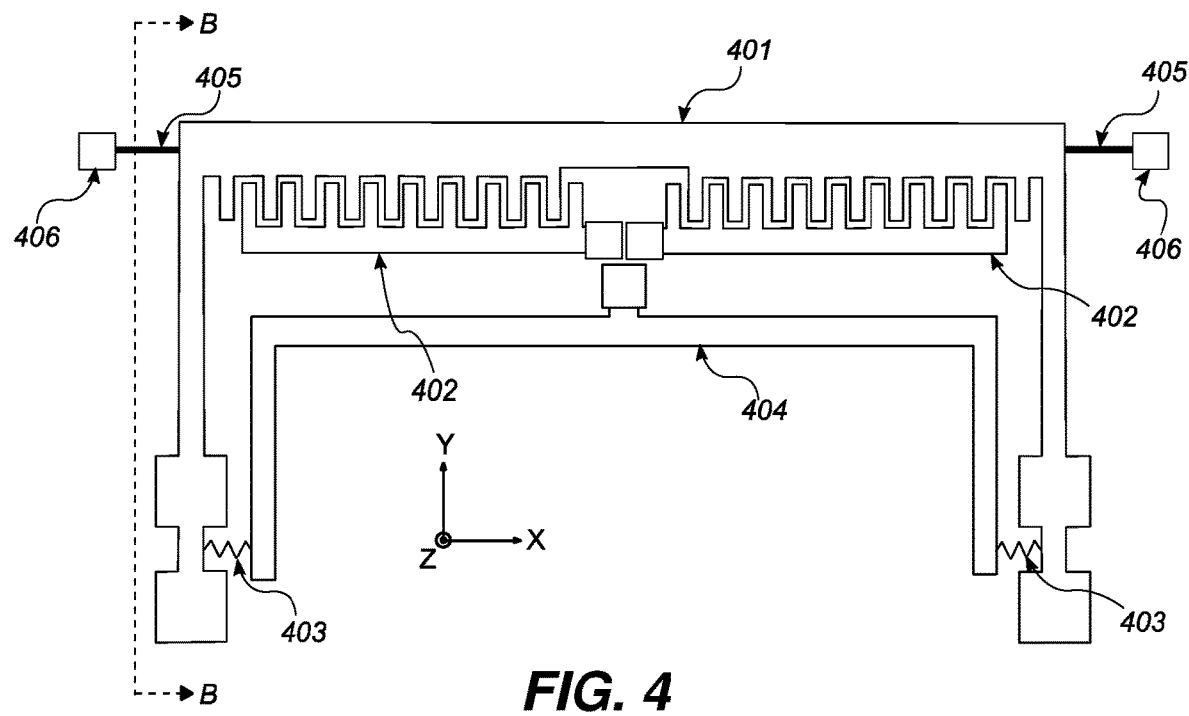
FIG. 4 shows a schematic of a first embodiment of the capacitive micromechanical accelerometer of the present invention.

FIG. 4 shows a schematic of a first embodiment of the accelerometer of the present invention. In common with the devices described above, the rotor 401 and the stator 402 are shown, and the rotor 401 is connected via the springs 403 to the rotor suspender 404. The accelerometer of FIG. 4 additionally includes damping springs 405, which connect to the rotor 401 to damping spring anchor points 406 on the substrate. The addition of the damping springs 405 to the rotor decreases the amplitude of motion in the X-Y plane caused by vibrations.

As shown in FIG. 4, the damping springs 405 are connected to the rotor 401 close to the rotor electrodes, i.e. the damping springs 405 are connected to either the longitudinal rotor bars 14, 15 at the ends of the longitudinal rotor bars distal to the rotor rotation axis RRA, or to opposite ends of the transversal rotor bar 13. The damping springs 405 extend from the rotor outwardly, i.e. towards the exterior of the accelerometer package, and are connected to the substrate such that the longitudinal axis of the springs is parallel to the rotor rotation axis. Since the rotor 401 is fixed to the rotor suspender 404 via springs 403, the greatest motion of the rotor 401 in the X-Y plane occurs at the end of the rotor distal to the rotor rotation axis RRA, i.e. the end of the rotor 401 at which the rotor electrodes are located. According to Hooke's law, the force needed to extend a spring by a distance x increases linearly with respect to the distance x. Thus, connecting the rotor 401 to the substrate via damping springs 405 located at the distal end of the rotor 401, where the maximum displacement of the rotor 401 in the X-Y plane occurs, maximises the restoring force of the damping springs 405 and thus maximised the damping effect of the spring on motion of the rotor 401.

Figure 5:
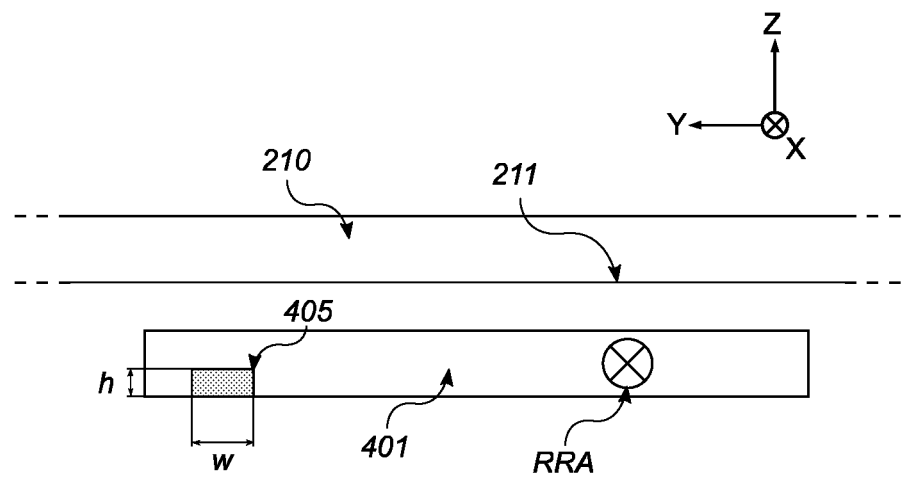
FIG. 5 shows a cross-section of the capacitive micromechanical accelerometer depicted in FIG. 4.

FIG. 5 shows a cross-section taken along line B-B shown in FIG. 4. The accelerometer package 210 and inner package plane 211 shown in FIG. 2 are again visible in FIG. 5, and the damping spring 405 is shown in cross-section. As can be seen in FIG. 5, the height h of the damping spring 405 is recessed from the upper surface of the rotor 401.

It will be appreciated, however, that the distal end of the rotor 401 is also where the maximum displacement of the rotor 401 in the Z direction occurs. Thus, a damping spring 405 located at the distal end of the rotor 401 also has the maximum effect on movement of the rotor in the normal mode, i.e. in the Z direction. Thus, in a second embodiment of the present invention, depicted in FIG. 6, damping springs 605 join the rotor 601 at a position closer to the rotor rotation axis RRA than in the embodiment depicted in FIG. 4. As a result, rotation of the rotor 601 results in a smaller displacement of the damping springs 605 in the Z direction, resulting in a smaller restoring force of the damping springs 605 and therefore improved sensitivity of the damping springs to small accelerations.

Figure 6:
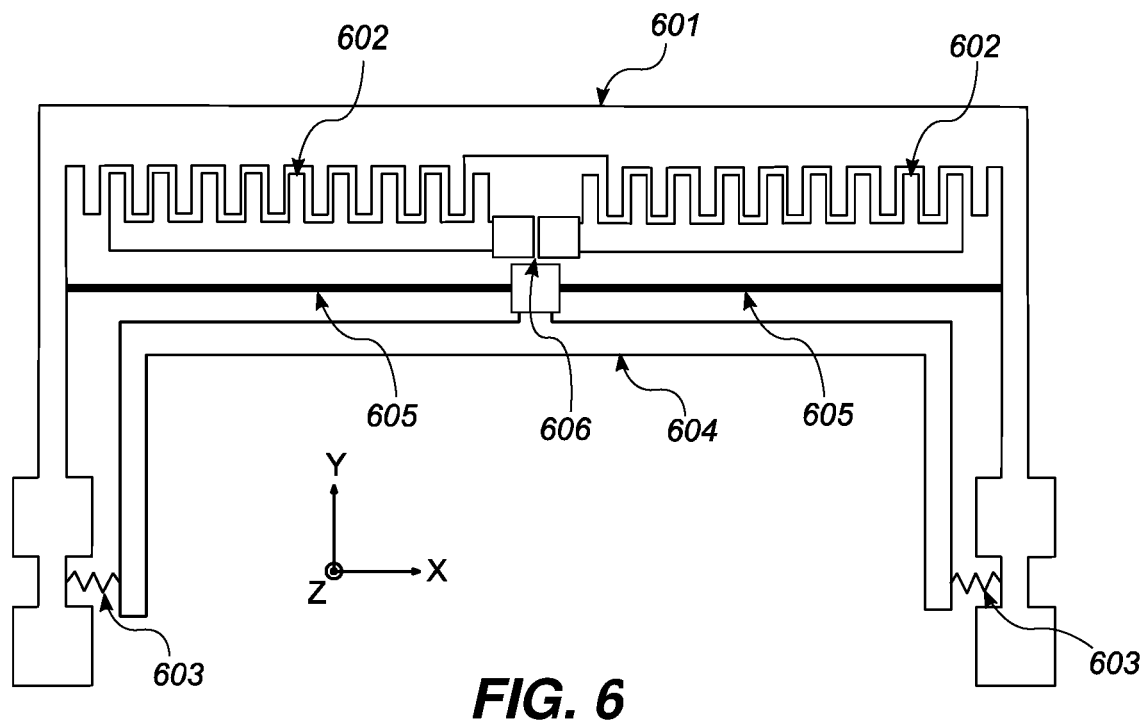
FIG. 6 shows a schematic of a second embodiment of the capacitive micromechanical accelerometer of the present invention.

Furthermore, instead of extending outwardly from the rotor 601 to the exterior of the accelerometer package, in the embodiment of FIG. 6, the damping springs 605 extend inwardly from the rotor 601 to the interior of the accelerometer package, connecting the rotor 601 to common anchor point 606. The stator 602 and rotor suspender 604 are also fixed to the common anchor point 606. As in the embodiment depicted in FIG. 4, in the embodiment of FIG. 6 torsional springs 603 join the rotor 601 to the rotor suspender 604. The use of common anchor points for the rotor suspender 604 and stator 602 is known in the art, for example as described in European patent number EP 3014284 B1, the disclosure of which is incorporated by reference in this application. The anchor points for anchoring the rotor suspender to the substrate and the anchor points for anchoring the stator to the substrate are located essentially in one and the same location or essentially adjacent to each other. Such anchoring causes mechanical stresses to move the rotor electrodes and the stator electrodes in the same way. When the relational position between rotor electrodes and stator electrodes does not change, the sensor output does not change either. Thus, error from common motion of the rotor electrodes and the stator electrodes can be minimized. The region in which the stator anchor points and rotor anchor points are fixed to the substrate is referred to as a "common anchor point".

By connecting rotor 601 to the common anchor point 606 via damping springs 605, deformation of the substrate, e.g. due to vibration at the natural frequency of the accelerometer package, does not causes the relative distance between the rotor 601 (in its correct position) and the point at which the damping springs 605 are anchored to the substrate to change. In contrast, in the embodiment of FIG. 4, deformation of the substrate may cause the anchor points of the damping springs 405 to move relative to the correct position of the rotor 401, thereby causing, rather than eliminating, movement of the rotor in the X-Y plane. Alternatively to connection to the common anchor point 606, the rotor 601 may be connected via damping springs 605 to additional anchor points which are located adjacent to the common anchor point 606.

Furthermore, since the damping springs 605 extend inwardly from the rotor 601 to the common anchor point 606, the length of the damping springs 605 is maximised without increasing the overall size of the accelerometer package, as is the case for the outwardly extending damping springs 405 in the embodiment of FIG. 4. As mentioned above, the spring constant of the damping spring in the Z direction is proportional to $wh^3/l^3$, where w is the width of the beam in the X-Y plane, h is the height of the beam in the Z direction, and l is the length of the beam in the X-Y plane. Thus, by increasing the length of the damping springs 605 in the X-Y plane, the embodiment of FIG. 6 further reduces the spring constant of the damping springs 605 in the Z direction, resulting in increased sensitivity of the device to low accelerations.

Figure 7:
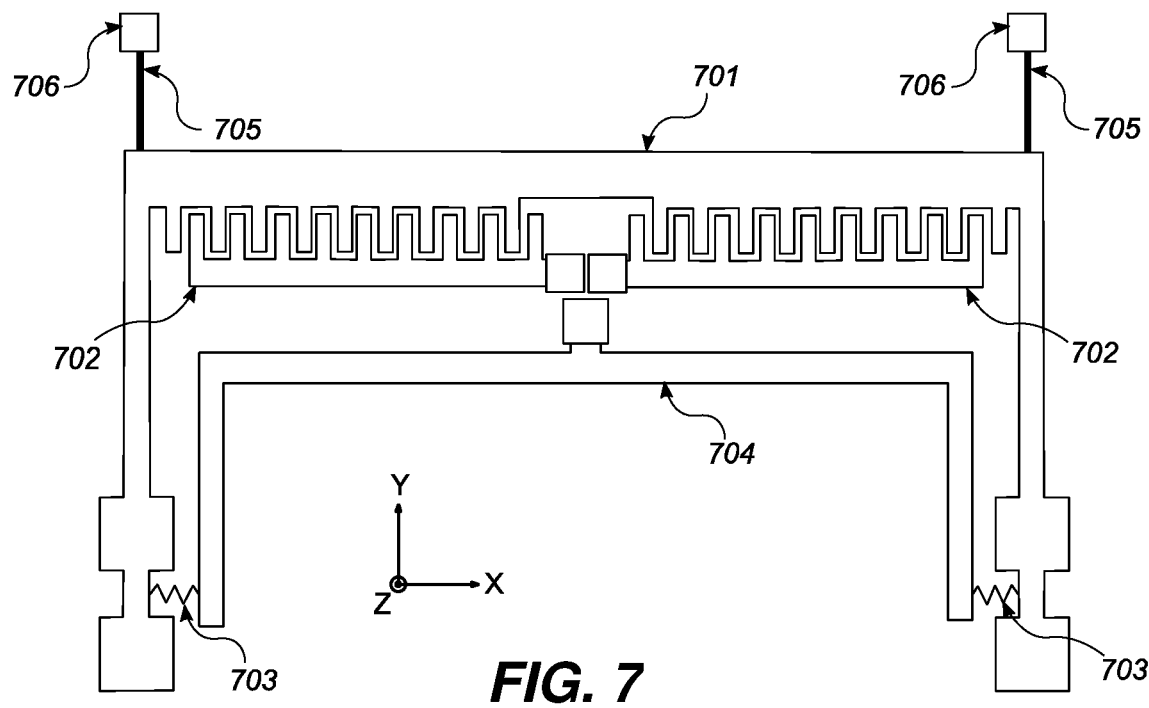
FIG. 7 shows a schematic of a third embodiment of the capacitive micromechanical accelerometer of the present invention.

FIG. 7 shows a further embodiment of the invention in which damping springs 705 are provided to reduce motion of the rotor 701 in the Y-direction, in contrast the springs of FIGS. 4 and 5 which reduce motion of the rotor in the X-direction. The damping springs 705 of FIG. 7 are configured in the same way as described with respect to the springs 405 of FIG. 4 except for the attachment location on the rotor 701 and the orientation of the damping springs. The springs 705 of FIG. 7 may be used in conjunction with the damping springs of FIG. 4 or 5 in order to reduce motion of the rotor in both the X and Y directions. As shown in FIG. 7, the damping springs 705 are connected to anchor points 706 and extend away from the transverse rotor bar towards the exterior of the accelerometer package in the Y direction.

Figure 8:
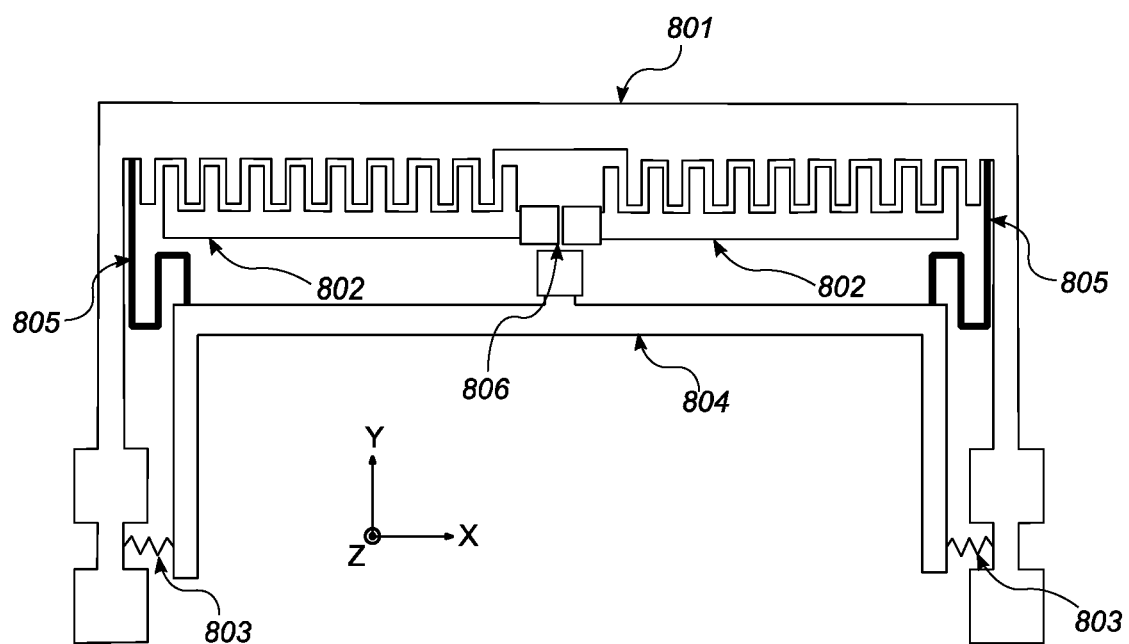
FIG. 8 shows a schematic of a fourth embodiment of the capacitive micromechanical accelerometer of the present invention.

An alternative embodiment for reducing motion of the rotor in the Y direction is shown in FIG. 8. The rotor 801 is connected to the rotor suspender 804 via damping springs 805 to the rotor suspender 804. In contrast to the torsion springs 803 which connect the rotor suspender 804 to the rotor 801 to enable rotation of the rotor about the rotor rotation axis, the damping springs 805 are connected to the transverse rotor bar (130 in FIG. 1) and are significantly longer, allowing for movement of the rotor out of the X-Y plane in the Z direction. Furthermore, by connecting the damping springs 805 to the rotor suspender 804, the damping springs are connected to the common anchor point 806 via the rotor suspender 804. Thus, as in the embodiment of FIG. 6, deformation of the substrate, e.g. due to vibration at the natural frequency of the accelerometer package, does not causes the relative distance between the rotor 801 (in its correct position) and the point at which the damping springs 805 are anchored to the substrate to change. Again, it will be appreciated that the damping springs 805 of FIG. 7 may be used in combination with the damping springs 405 of FIG. 4 or 605 of FIG. 6 in order to minimise motion of the rotor in both the X and Y directions.

While the damping springs depicted in FIGS. 4 to 6 have been depicted as beams, other shapes may be used for the damping springs. For example, damping springs may be used which include forked portions or meandering portions which increase the effective length of the spring, thereby significantly reducing the spring constant in the Z direction while having less impact on the spring constant in the X or Y direction.

The invention claimed is:

1. A capacitive micromechanical accelerometer comprising:
    a substrate, which defines a substrate plane;
    a rotor mounted to the substrate via one or more torsion springs enabling rotation of the rotor with respect to the substrate plane about a rotor rotation axis; and
    a stator, which is fixed with respect to the substrate plane;
    wherein the rotor includes one or more rotor electrodes and the stator includes one or more stator electrodes, the rotor and stator electrodes being configured such that rotation of the rotor caused by acceleration of the capacitive micromechanical accelerometer in the direction perpendicular to the substrate plane causes a change in the effective area of overlap between the rotor and stator electrodes or the distance between the rotor and stator electrodes;

wherein the capacitive micromechanical accelerometer further comprises one or more damping springs connecting the rotor to the substrate, wherein each damping spring has a height perpendicular to the substrate plane that is smaller than a height perpendicular to the substrate plane of the one or more torsion springs; and the rotor is connected to the substrate via the one or more torsion springs and a rotor suspender, wherein the stator and rotor suspender are fixed to a common anchor point on the substrate, and wherein the one or more damping springs are connected to the common anchor point, optionally via the rotor suspender.

2. The capacitive micromechanical accelerometer of claim 1, wherein the damping springs are oriented parallel to the rotor rotation axis.

3. The capacitive micromechanical accelerometer of claim 1, wherein the damping springs are oriented perpendicular to the rotor rotation axis.

4. The capacitive micromechanical accelerometer of claim 1, wherein the rotor comprises two longitudinal rotor bars and a transversal rotor bar, the two longitudinal rotor bars extending perpendicularly away from the rotor rotation axis and the transversal rotor bar being disposed at the distal end of the longitudinal rotor bars, parallel to the rotor rotation axis, and wherein the one or more rotor electrodes are disposed on the transversal rotor bar.

5. The capacitive micromechanical accelerometer of claim 1, wherein the damping springs extend away from the rotor towards the interior of the accelerometer in a direction parallel to the rotor rotation axis.

6. The capacitive micromechanical accelerometer of claim 1, wherein the damping springs extend away from the rotor towards the interior of the accelerometer in a direction perpendicular to the rotor rotation axis.

7. The capacitive micromechanical accelerometer of claim 1, wherein the one or more rotor electrodes and one or more stator electrodes form interleaved combs or parallel plates.

* * * * *